United States Patent [19]
Jacobs et al.

[11] Patent Number: 5,627,455
[45] Date of Patent: May 6, 1997

[54] BOOST TOPOLOGY WITH TWO OUTPUTS FOR POWER FACTOR CORRECTION APPLICATION

[75] Inventors: Mark E. Jacobs, Dallas; Richard W. Farrington, Mesquite, both of Tex.

[73] Assignee: Lucent Technologies Inc., Murray Hill, N.J.

[21] Appl. No.: 344,309

[22] Filed: Nov. 22, 1994

[51] Int. Cl.⁶ .............................. G05F 1/10; G05F 1/656; H02M 5/42; H02M 7/68
[52] U.S. Cl. ............................................ 323/222; 363/89
[58] Field of Search ............................. 323/222, 267; 363/39, 89, 127

[56] References Cited

U.S. PATENT DOCUMENTS

| | | | |
|---|---|---|---|
| 5,072,355 | 12/1991 | Huillet | 363/89 |
| 5,122,724 | 6/1992 | Criss | 323/222 |
| 5,155,430 | 10/1992 | Gulcznski | 323/224 |
| 5,319,533 | 6/1994 | Reynolds et al. | 363/17 |
| 5,345,376 | 9/1994 | Nourbaksh | 363/62 |

*Primary Examiner*—Peter S. Wong
*Assistant Examiner*—Bao Q. Vu

[57] ABSTRACT

A split boost converter is disclosed herein, suitable for both single phase and three phase AC input applications. It provides two equal but unparallelable output voltages stored on two separate independent output capacitors. The implementation supports two modes of operation in which two power switches are operated simultaneously or alternately. Each mode maintains the advantage of a reduced boost inductor size. In the first mode the charging of the capacitors in parallel circuits and their discharge in a series connection substantially reduces ripple current in the inductor permitting the user of a smaller inductor. In the second mode the capacitors are charged and discharged in differing time intervals achieving a similar result. The circuit is operable with input voltages which must exceed the voltages of its two output capacitors.

4 Claims, 7 Drawing Sheets

BOOST TOPOLOGY WITH TWO OUTPUTS FOR POWER FACTOR CORRECTION APPLICATION

FIELD OF THE INVENTION

This invention relates to boost convertors with multiple outputs that are used as a front-end power processing stage in off-line rectifiers.

BACKGROUND OF THE INVENTION

Boost converters are commonly used in high power factor applications as line conditioners. The boost stage processes the AC input and develops a DC output voltage, typically 400 V or 800 V. Boost converters are typically the topology of choice for providing a high output voltage (i.e., 400 V or 800 V) from substantially lower input DC voltages derived from sinusoidal input voltages. In applications with high AC input voltage (i.e., 320 to 480 VAC) where an intermediate DC bus voltage of 700 to 800 V is necessary, a soft-switched boost is often used to maintain the overall efficiency of the rectifier. For lower AC input voltage applications, a simple snubber to slow down the turn-off of the boost diode is all that is necessary to obtain a boost efficiency of 96–98%. In recent years, several new topologies have been proposed in which the semiconductor switching losses are minimized by adding an auxiliary active circuit. The addition of the auxiliary circuit is an elegant solution but it results in increased cost and complexity.

A recent paper by Y. Jiang and F. C. Lee, entitled "Three-Level Boost Converter for Application in Single Phase Power Factor Correction", Virginia Power Electronics Center (VPEC) Power Electronics Seminar Proceedings, 1994, Virginia Polytechnic Institute and State University, Blacksburg, Va., pp. 127–133 suggests a configuration for a boost stage that accommodates semiconductor devices rated for approximately half the normal output voltage, (i.e., $V_o/2$) for use in high voltage, single-phase applications. Jiang and Lee's circuit, which they call a three-level boost, provides two unparallelable but equal output voltages. By reducing the maximum voltage stresses across the semiconductor devices, a zero-voltage switching topology becomes less important to maintain high efficiency. In addition to reducing the voltage stresses across all semiconductor devices to half of the normal output bus voltage, the three-level boost also decreases the size of the boost inductor without compromising EMI performance.

SUMMARY OF THE INVENTION

A split boost converter is disclosed herein, suitable for both single phase and three phase AC input applications including variable DC input voltage situations. It provides two equal but unparallelable output voltages stored on two separate, independent output capacitors. Efficiency is enhanced by a circuit topology which limits the lowest operative input voltage to a value not less than the voltage level of each of the two output voltages. The implementation supports two modes of operation. In one of the two modes the two power switches are operated simultaneously to optimize the use of available silicon devices while maintaining the advantage of a reduced boost inductor size. The charging of the capacitors in parallel circuits and their discharge in a series connection substantially reduces ripple current in the inductor permitting the use of a smaller sized inductor. In the other operational mode the capacitors are charged and discharged in differing time intervals achieving a similar reduction of inductor size. The circuit, in both modes, is operable with input voltages which must exceed the individual voltages of its two output capacitors.

FETs are used as the active switches in the below illustrative embodiment. However, the circuit topology is not limited to these types of semiconductor switches.

DETAILED DESCRIPTION

Figure 1:
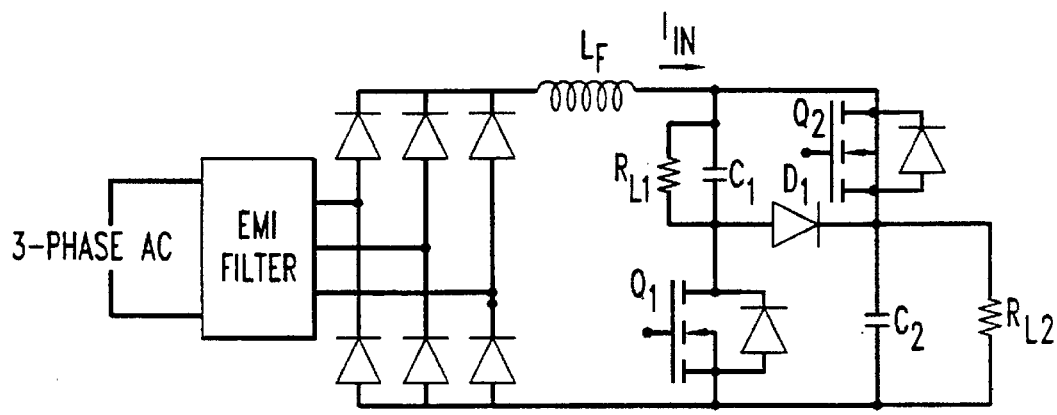
FIG. 1 is a schematic of a boost converter embodying the principles of the invention and having a three phase, six diode bridge.

An implementation of the proposed boost stage is shown in FIG. 1. Inductor $L_F$ is the boost inductor, capacitors $C_1$ and $C_2$ are the output capacitors, $Q_1$ and $Q_2$ are the active switches, and $D_1$ is the passive switch, i.e., the boost diode. Capacitors $C_1$ and $C_2$ are relatively large and the voltages across them are essentially constant during one switching cycle. Since the two output capacitors are not in series, the proposed boost stage supplies two independent loads as depicted in FIG. 1 by resistors $R_{L1}$ and $R_{L2}$. Control circuitry for driving the power switches of converters such as these is well known and hence is not described herein.

Figure 3:
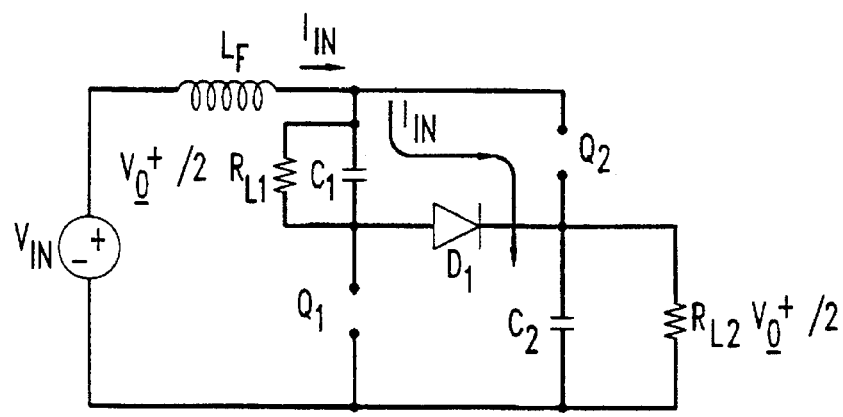
Figure 4:
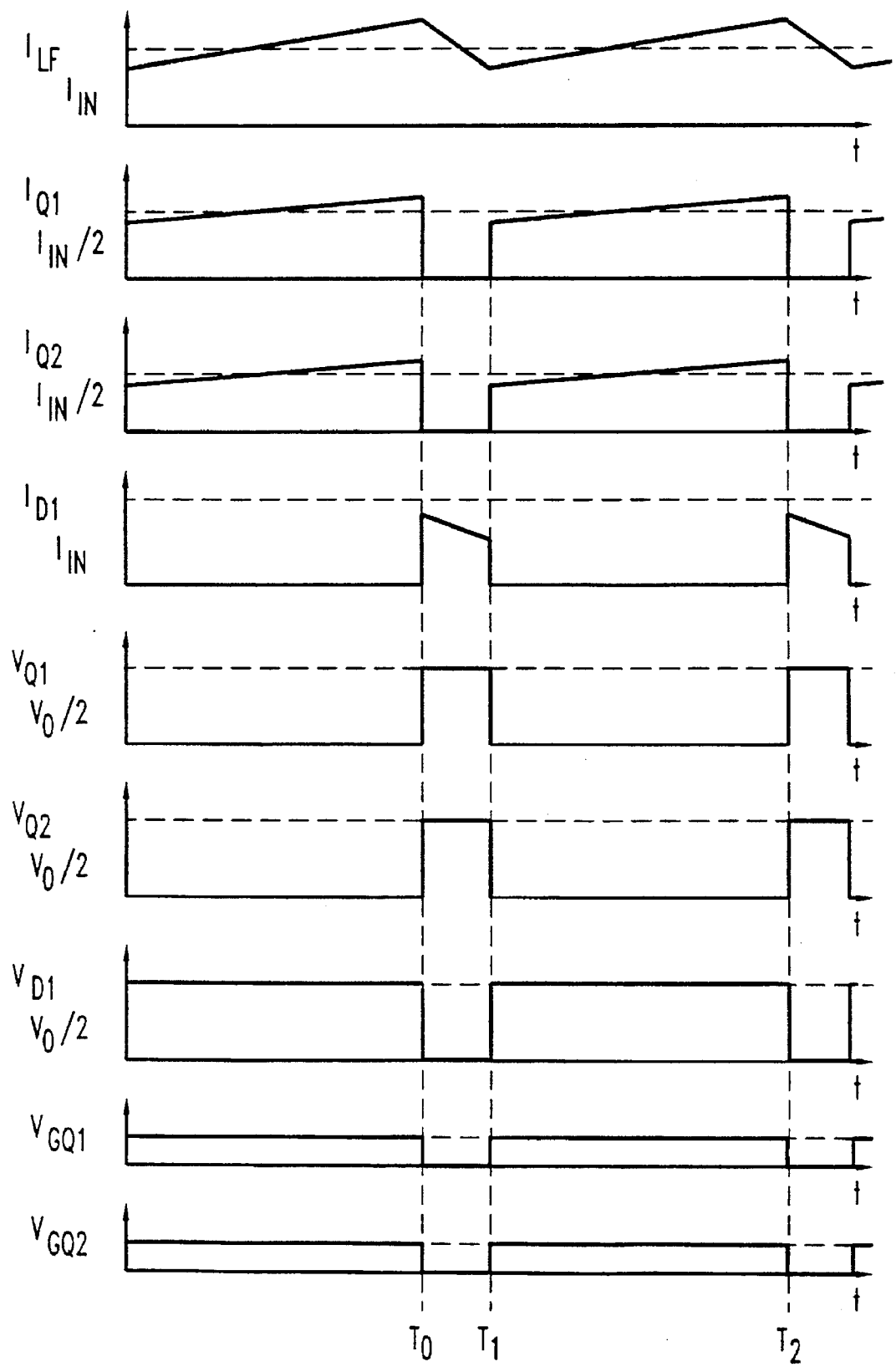
FIG. 4 discloses waveforms of the boost converter of FIG. 1 operating in the first mode.

This converter can operate in each of two different modes. In mode 1, switches $Q_1$ and $Q_2$ are turned on and off at the same time, i.e., synchronously. The two topological stages this converter goes through in one switching cycle are shown in the schematics of FIGS. 2 and 3, and the ideal waveforms representing this operation of the converter are shown in FIG. 4.

Figure 2:
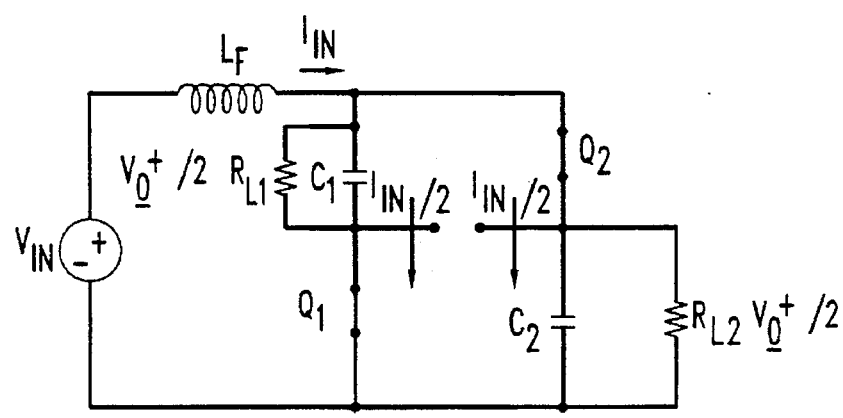
FIGS. 2 and 3 are schematics of two stages of a first mode of operation of the circuit of FIG. 1.

In this mode 1, as shown in the FIG. 2, when the two switches $Q_1$ and $Q2$ are simultaneously turned-on at time $t_0$, the two capacitors $C_1$ and $C_2$ are connected in parallel, since the diode $D_1$ is non conducting. The current through the boost inductor $L_F$ increases at a linear rate approximately equal to $(V_{IN}-V_o/2)/L_F$. At the same time $t_0$, energy is stored in the output capacitors $C_1$ and $C_2$ and/or transferred to the load, as long as the condition. $V_o/2<V_{IN}<V_o$ holds. It is the meeting of this last condition that makes this topology well suited for a three-phase application where a three-phase six-diode bridge is followed by a boost stage. Similar to the three-level boost proposed by Jiang and Lee, the ripple current through the inductor is reduced considerably relative to traditional boost stages by allowing the boost inductor to build up current through the series combination of the input voltage source and the parallel combination of the output capacitors. At time $t_1$ both active switches $Q_1$ and $Q_2$ are turned off and inductor $L_F$ is reset through diode $D_1$ and the now series combination of capacitors $C_1$ and $C_2$ as shown in FIG. 3. It is important to note that in this mode 1 power is transferred to the load from the input at all times, reducing the rms current through the two output capacitors $C_1$ and $C_2$. This is an important feature since capacitors are generally rated for supporting a maximum rms current. The circuit waveforms are shown in the FIG. 4 and include the inductor current $I_{LF}$ and the two switching device currents $I_{Q1}$ and $I_{Q2}$ a and their voltage drops $V_{Q1}$ and $V_{Q2}$. The diode current $I_{D1}$ and its voltage drop $V_{D1}$ is also shown. The voltage drops $V_{GQ1}$ and $V_{GQ2}$ represent the gate-to-source voltage applied to the FET switches $Q_1$ and $Q_2$.

Just as switches $Q_1$ and $Q_2$ can be operated synchronously with simultaneous identical conduction states, they can also be turned on and off in an alternating fashion, defined herein as mode 2. The topological stages this converter goes through in one switching cycle are shown in the FIGS. 5 through 8 and the ideal waveforms representing the operating of the converter are shown in FIG. 9. The operation in this mode is similar to that described for the converter operating in mode 1. The main differences is that in mode 2, the effective frequency of the boost inductor current ripple is doubled and power is not transferred continuously from the input to the output, as it is in mode 1. "In the second mode the two capacitors $C_1$, $C_2$ are alternately connected to the same input current while they discharge into one another while connected in series".

Figure 5:
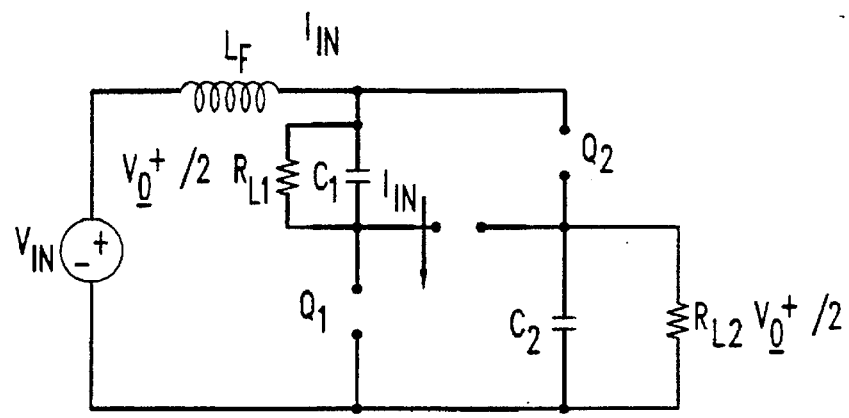
FIGS. 5 through 8 are schematics of stages of a second mode of operation of the circuit of FIG. 1.

In FIG. 5, $Q_1$ is conducting while $Q_2$ and $D_1$ are open or non conducting. In this state the capacitor $C_1$ is being charged by current $I_{IN}$ through the inductor $L_F$.

Figure 6:
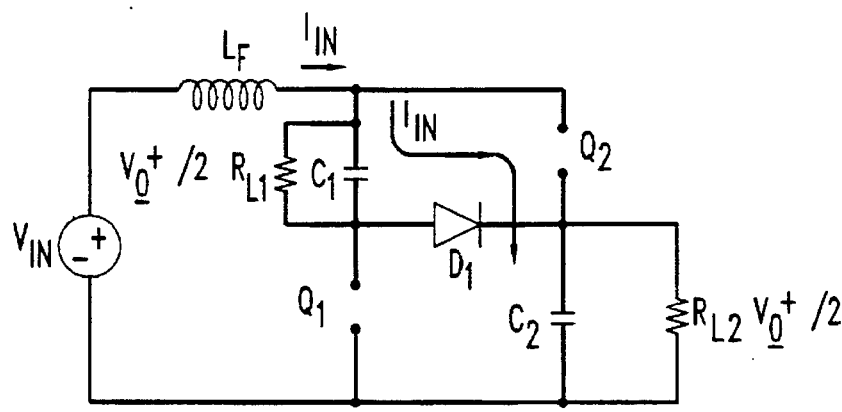

The subsequent connection stage in FIG. 6 has both switches $Q_1$ and $Q_2$ biased non conducting while the diode $D_1$ is conducting. In this stage the current $I_{IN}$ charges the capacitor $C_2$.

Figure 7:
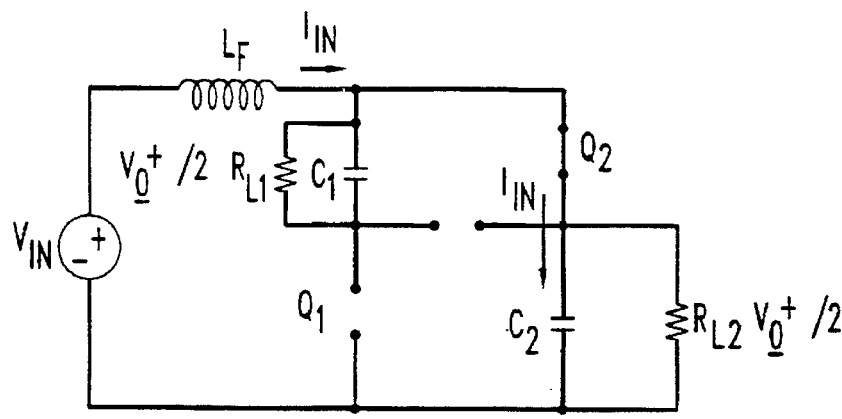

In the stage shown in FIG. 7 the switch $Q_2$ is biased conducting with switch $Q_1$ and diode $D_1$ non conducting. The input current $I_{IN}$ continues to charge the capacitor $C_2$.

Figure 8:
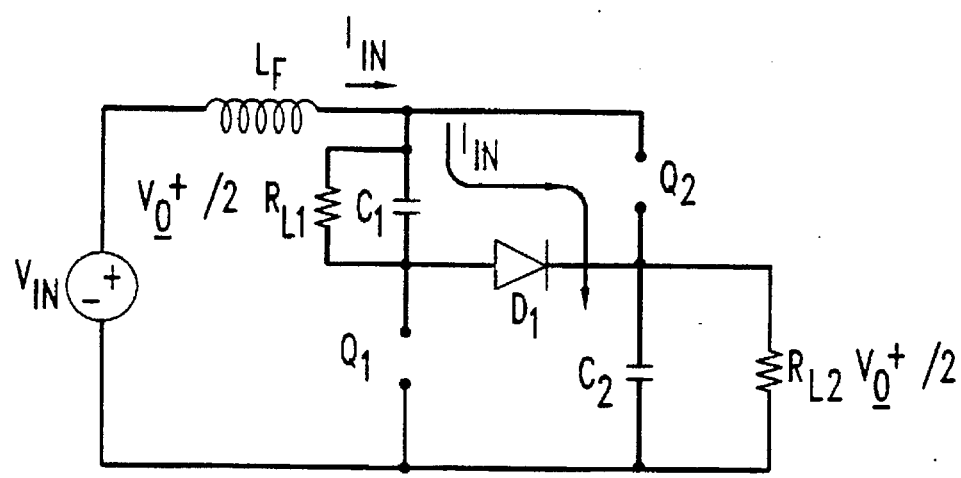
Figure 9:
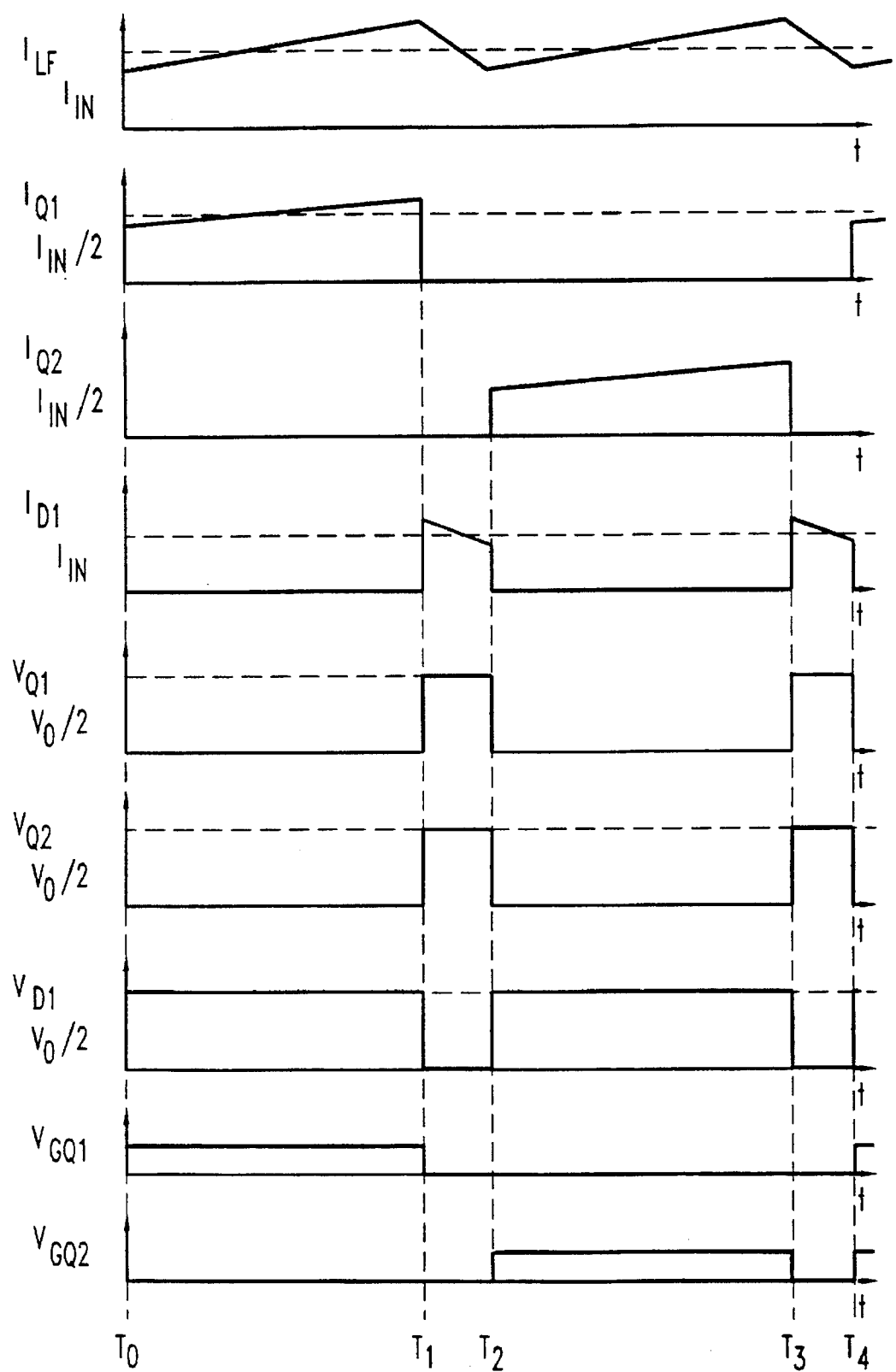
FIG. 9 discloses waveforms of the boost converter of FIG. 1 operating in the second mode.

The next stage, shown in FIG. 8 has both switches $Q_1$ and $Q_2$ non conducting and both the capacitors $C_2$ and $C_2$ are charged in series by $I_{IN}$ through the diode $D_1$.

Figure 10:
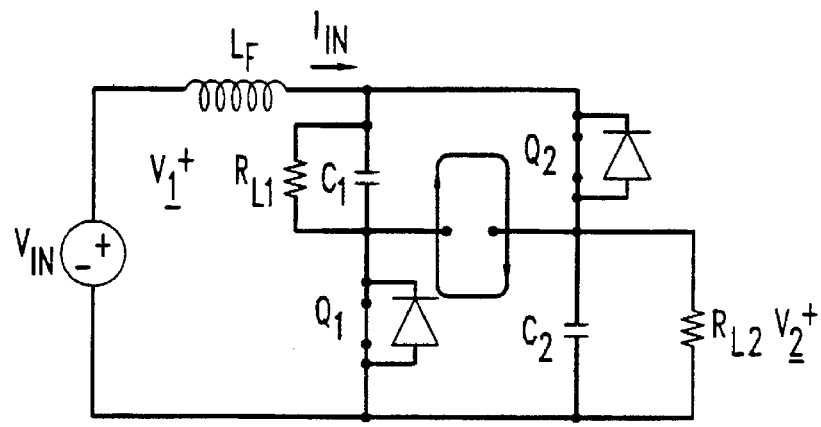
FIG. 10 is a schematic of the circuit topology for assisting in describing equalizing of the capacitor voltages.

Even though it may appear from the description above that two independent voltage control loops are necessary to maintain a voltage of $V_O/2$ across both output capacitors, it can be seen that, in mode 1, by controlling the voltage across one of the output capacitors, the voltage across the second output is also controlled. This feature is inherent in the operation of the circuit of mode 1 and is a further advantage over the three level boost. It results from the fact that when both switches are turned on, as in mode 1, the two output capacitors are effectively in parallel, allowing for the capacitor with the higher output voltage to discharge into the other output capacitor, as shown in FIG. 10. Therefore, two perfectly matched loads are not necessary to insure proper balanced voltage operation. Computer simulations indicate that an imbalance of only a couple of volts will result between the two output capacitors for a 50% load imbalance.

Figure 11:
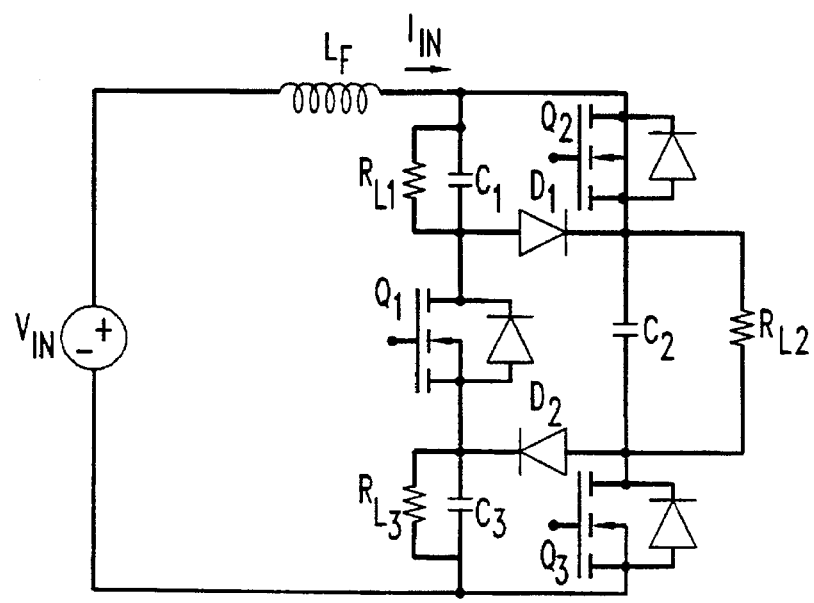
FIG. 11 is a schematic of a multiple level split boost converter with three output capacitors, three switches, two diodes.
Figure 12:
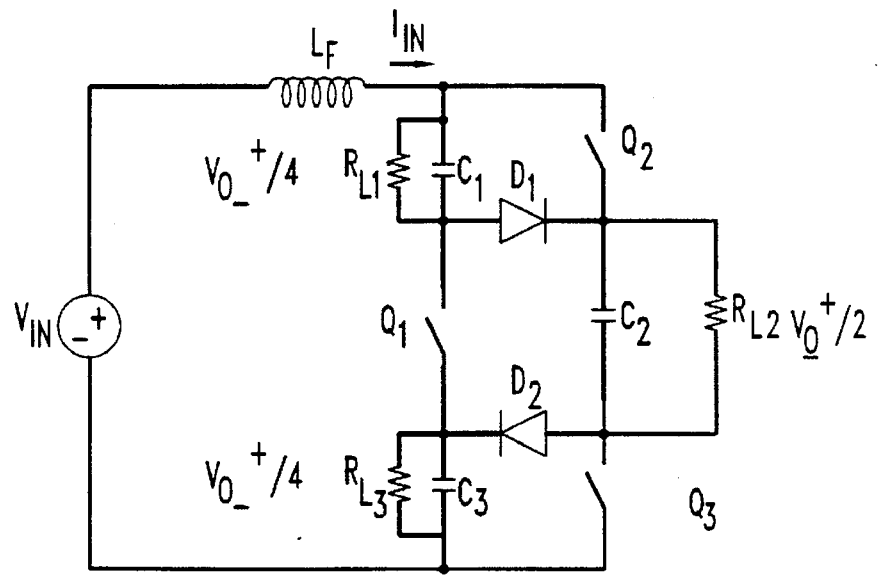
FIGS. 12 and 13 are schematics of two stages for describing a mode of operation of the circuit of FIG. 11.
Figure 13:
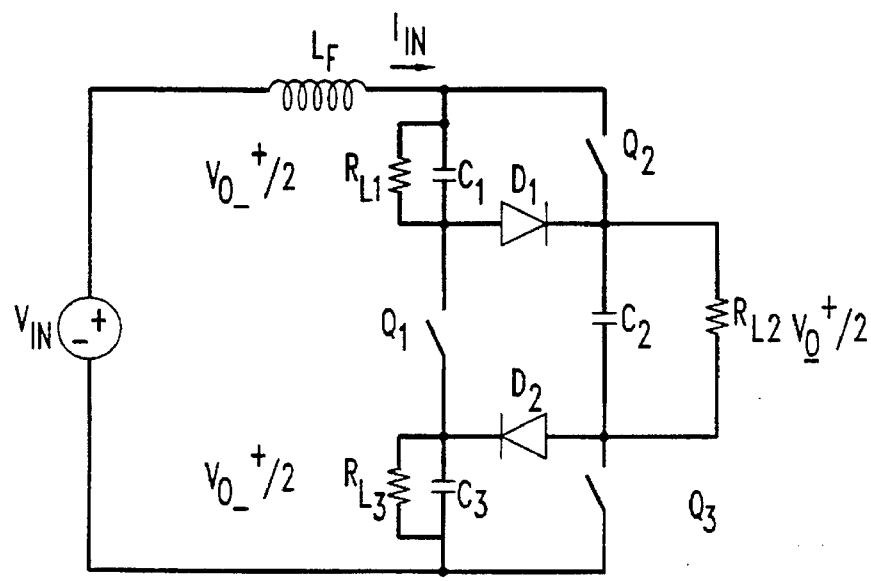
Figure 1:
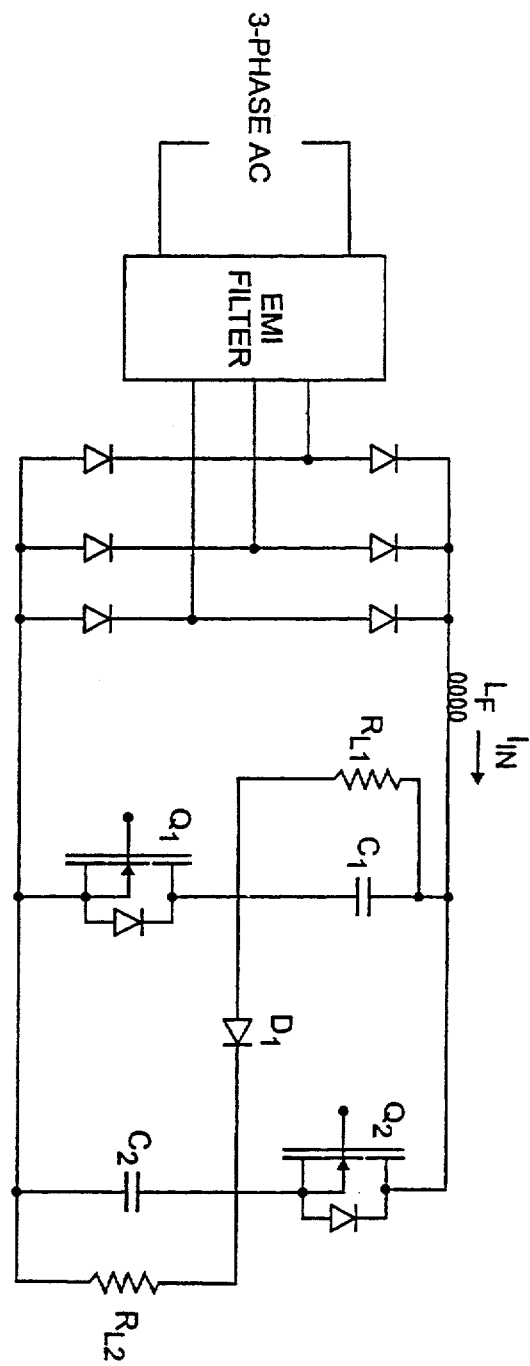
Figure 5:
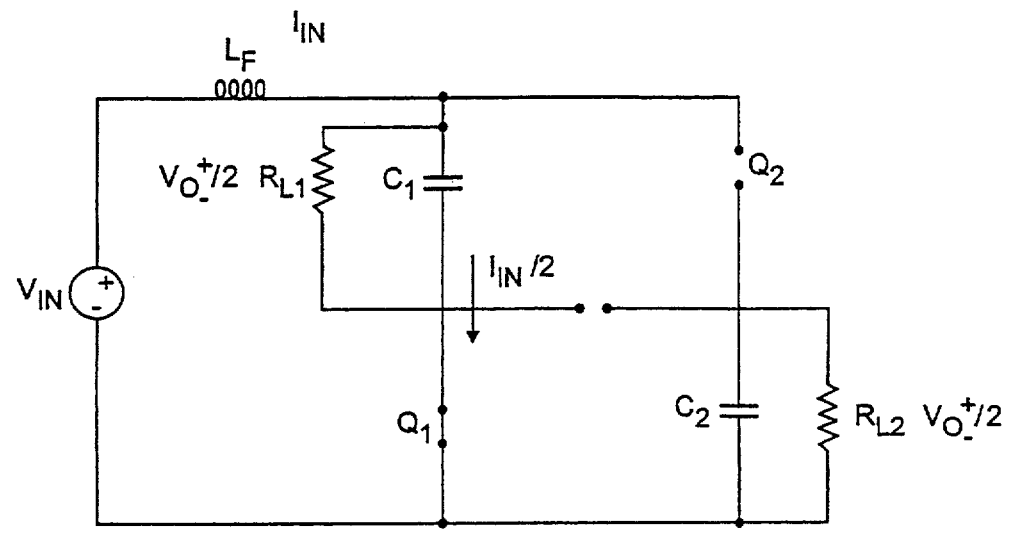

The split-boost concept can be generalized to implement a multi-level boost stage by providing additional output capacitors, each accompanied by a switch and diode. A multi-level boost stage that can control the magnitude of the input current tipple depending on the number of switches that are open/closed at a given time can be implemented. FIG. 11 shows a split boost using three output capacitors, $C_1$, $C_2$ and $C_3$; three switches, $Q_1$, $Q_2$ and $Q_3$, and two diodes, $D_1$ and $D_2$. In this converter the magnitude of the current ripple given an input voltage can be one of two possible alternatives depending on whether one switch is closed at a time or a combination of two switches, as shown in FIGS. 12 and 13. Having the ability to control the slope of the input current can be used to shape the input current to a desired reference with better precision, or to reduce the size of the input inductor. It is this second feature that is often more important, since in many high power supplies the size of the magnetics dominates the overall design.

The three output split boost topology, particularly when operating in mode 1, has an intrinsic efficiency advantage compared to a traditional boost, both in FET conduction and in FET switching losses. In addition, the boost diode conduction and switching losses are also reduced because the required boost diode can have a lower voltage rating.

The mode illustrated in FIG. 12 allows for independent conduction of the switches $Q_2$ and $Q_3$ and the simultaneous conduction of switches $Q_1$, $Q_2$ and $Q_3$. The mode of FIG. 13 allows for simultaneous conduction of switches $Q_1$ and $Q_2$ and of $Q_1$ and $Q_3$.

To demonstrate the FET switching loss improvement in mode one, the output capacitance $C_{OSS25}$ for a typical FET at 25 V drain to source can be approximated by the equation:

$$C_{OSS25} = 0.2(V_b/R_{ds})10^{-12}$$

where $V_b$ is the FET drain-to-source voltage rating, and $R_{ds}$ is the FET on-resistance at 25° C. In a traditional boost the power loss P due to repetitively discharging the FET output capacitance can be represented by $$P = (0.67 V_b V_{ds}^{1.5} f_s/R_{ds})10^{-12}$$

where $V_{ds}$ is the drain-to-source voltage of the FET at the time of switching, and $f_s$ is the switching frequency.

The equivalent loss for the split beast can be calculated assuming the same FET silicon area is used in both circuits. Since the split boost requires only half the voltage rating for each FET, the total FET on-resistance is reduced by a factor of about four. Since two FETs are required in the split boost, each FET has about half the on-resistance of the equivalent traditional boost. The FET output capacitance is scaled from the equation for $C_{OSS25}$, above. Completing the analysis shows that the resulting total switching losses for discharging FET output capacitances for the split boost are about 70% of those for the traditional boost.

The FET conduction losses for the split boost also compare favorably with those of a traditional boost converter. For a traditional boost with an input voltage of $V_{IN}$ and an output voltage $V_O$, the required duty cycle D is $$D = (V_O - V_{IN})/V_O.$$

The FET losses P b due to conduction for an output current $I_O$ are $$P_b = D[I_O/(1-D)]^2 R_{ds}.$$

where $R_{ds}$ is the FET on-resistance. After substitution and simplification this becomes $$P_b = (V_O - V_{IN})I_O^2 V_O (R_{ds}/V_{IN}^2).$$

For the split boost, assuming each output capacitor is charged to $V_O/2$, the duty cycle D is $$D = 2(V_O - V_{IN})/V_O.$$

The total FET conduction losses $P_s$ for the split boost, with each FET having an on-resistance of $R_{ds}/2$ to maintain equal silicon area, are $$P_s=2D[I_o/(2-D)]^2 R_{ds}/2.$$

After substitution and simplification this becomes $$P_s=0.5(V_o-V_{IN})I_o^2 V_o(R_{ds}/V_{IN}^2).$$

which is half the expression for the traditional boost. Thus the ratio of FET conduction losses of the split boost compared to the traditional boost for any input voltage $V_{IN}$ where $V_o/2<V_{IN}<V_o$ is 0.5 for the same total FET silicon area. The reduced switching and conductor losses demonstrate the advantage of the split boost when the input voltage range can be limited as described.

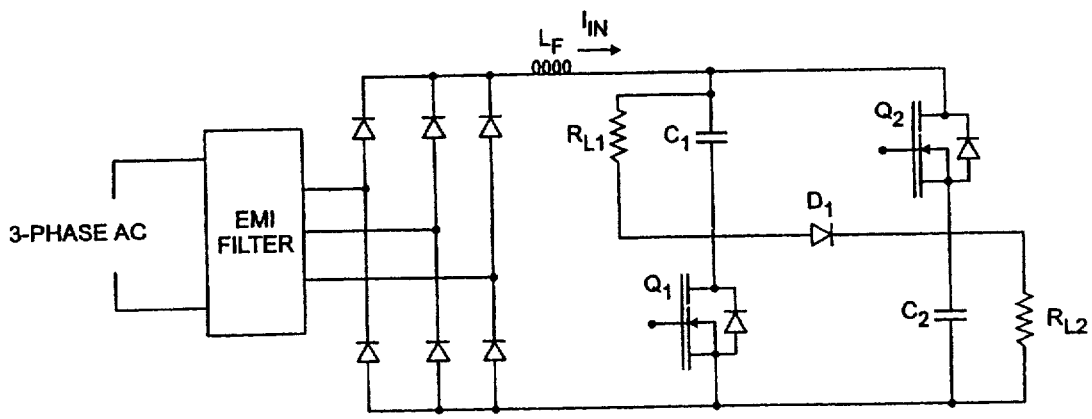

We claim:

1. A boost converter, comprising:

an input to accept a DC voltage which may be derived from a rectified AC voltage;

an inductor connected to the input;

first and second output capacitors each connected to first and second outputs;

first and second power switches for alternatively connecting first and second capacitors in a series and parallel connection, respectively;

a diode switch connecting a common node of the first capacitor and first power switch to a common node of the second capacitor and the second power switch and when biased conducting connecting the first and second capacitors in series connection when the first and second power switches are simultaneously non-conducting and when biased non-conducting electrically isolating the first and second capacitors from each other when the first and second power switches are conducting.

2. A boost converter, as claimed in claim 1, comprising:

the first and second power switches are biased simultaneously conducting and simultaneously non-conducting.

3. A boost converter, as claimed in claim 1, comprising:

the first and second power switches are biased alternatively conducting and alternatively non-conducting.

4. A boost converter, as claimed in claim 1, comprising:

a third capacitor connected to a third output and connected in series with the first capacitor and the first power switch;

a third power switch connected in series with the second capacitor and the second power switch; and a second diode switch to connect a node common to the first switch and third capacitor and second capacitor and third switch.

* * * * *

UNITED STATES PATENT AND TRADEMARK OFFICE
CERTIFICATE OF CORRECTION

PATENT NO. : 5,627,455
DATED : May 6, 1997
INVENTOR(S) : Mark E. Jacobs, et al

It is certified that error appears in the above-identified patent and that said Letters Patent is hereby corrected as shown below:

The title page, should be deleted to be replaced with the attached title page.
The drawing sheets, consisting of Figs. 1 and 5, should be deleted to be replaced with the drawing sheets, consisting of Figs. 1 and 5, as shown on the attached pages.

Signed and Sealed this

Ninth Day of December, 1997

Attest:

BRUCE LEHMAN

*Attesting Officer*  *Commissioner of Patents and Trademarks*

United States Patent [19]

Jacobs et al.

[11] Patent Number: 5,627,455
[45] Date of Patent: May 6, 1997

[54] BOOST TOPOLOGY WITH TWO OUTPUTS FOR POWER FACTOR CORRECTION APPLICATION

[75] Inventors: Mark E. Jacobs, Dallas; Richard W. Farrington, Mesquite, both of Tex.

[73] Assignee: Lucent Technologies Inc., Murray Hill, N.J.

[21] Appl. No.: 344,309

[22] Filed: Nov. 22, 1994

[51] Int. Cl.$^6$ .................... G05F 1/10; G05F 1/656; H02M 5/42; H02M 7/68
[52] U.S. Cl. .................... 323/222; 363/89
[58] Field of Search .................... 323/222, 267; 363/39, 89, 127

[56] References Cited

U.S. PATENT DOCUMENTS

| | | | |
|---|---|---|---|
| 5,072,355 | 12/1991 | Huillet | 363/89 |
| 5,122,724 | 6/1992 | Criss | 323/222 |
| 5,155,430 | 10/1992 | Gulczynski | 323/224 |
| 5,319,533 | 6/1994 | Reynolds et al. | 363/17 |
| 5,345,376 | 9/1994 | Nourbaksh | 363/62 |

Primary Examiner—Peter S. Wong
Assistant Examiner—Bao Q. Vu

[57] ABSTRACT

A split boost converter is disclosed herein, suitable for both single phase and three phase AC input applications. It provides two equal but unparallelable output voltages stored on two separate independent output capacitors. The implementation supports two modes of operation in which two power switches are operated simultaneously or alternately. Each mode maintains the advantage of a reduced boost inductor size. In the first mode the charging of the capacitors in parallel circuits and their discharge in a series connection substantially reduces ripple current in the inductor permitting the user of a smaller inductor. In the second mode the capacitors are charged and discharged in differing time intervals achieving a similar result. The circuit is operable with input voltages which must exceed the voltages of its two output capacitors.

4 Claims, 7 Drawing Sheets